US012350705B2

(12) United States Patent
Hozumi

(10) Patent No.: US 12,350,705 B2
(45) Date of Patent: Jul. 8, 2025

(54) COATING DEVICE, COATING FILM, AND COATING METHOD

(71) Applicant: KYOCERA CORPORATION, Kyoto (JP)

(72) Inventor: Daisuke Hozumi, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 660 days.

(21) Appl. No.: 17/638,175

(22) PCT Filed: Aug. 28, 2020

(86) PCT No.: PCT/JP2020/032768
§ 371 (c)(1),
(2) Date: Feb. 24, 2022

(87) PCT Pub. No.: WO2021/040028
PCT Pub. Date: Jun. 4, 2021

(65) Prior Publication Data

US 2022/0347713 A1 Nov. 3, 2022

(30) Foreign Application Priority Data

Aug. 30, 2019 (JP) ................................ 2019-159144

(51) Int. Cl.

| | |
|---|---|
| ***B05C 5/02*** | (2006.01) |
| ***B05B 1/14*** | (2006.01) |
| ***B05B 12/12*** | (2006.01) |
| ***B05B 13/04*** | (2006.01) |
| ***B05C 11/10*** | (2006.01) |
| ***B05D 1/26*** | (2006.01) |

(52) U.S. Cl.
CPC .............. *B05C 5/0291* (2013.01); *B05B 1/14* (2013.01); *B05B 13/0431* (2013.01); *B05C 11/10* (2013.01); *B05D 1/26* (2013.01); *B05B 12/124* (2013.01)

(58) Field of Classification Search
CPC ....... B05C 5/0291; B05C 11/10; B05C 5/027; B05C 11/1021; B05B 1/14; B05B 13/0431; B05B 12/124; B05D 1/26; B05D 7/22
USPC .......................................................... 428/161
See application file for complete search history.

(56) References Cited

U.S. PATENT DOCUMENTS

| | | | |
|---|---|---|---|
| 8,075,279 | B2 | 12/2011 | Ahmad et al. |
| 8,882,242 | B2 | 11/2014 | Beier et al. |

(Continued)

FOREIGN PATENT DOCUMENTS

| | | | |
|---|---|---|---|
| CN | 1472014 | A | 2/2004 |
| EP | 0051710 | A1 | 5/1982 |

(Continued)

*Primary Examiner* — Bradley W Thies
(74) *Attorney, Agent, or Firm* — HAUPTMAN HAM, LLP

(57) ABSTRACT

A coating device coats a to-be-coated object including a recessed portion extending in a first direction. The coating device includes a head, an arm, and a controller. The head includes a nozzle surface. The arm holds the head. The controller controls movement of the head via the arm. The controller moves the head in the first direction while causing the nozzle surface and the recessed portion to face each other in a posture in which a length of a first component along the first direction of the head is larger than a length of a second component of the head intersecting the first component.

10 Claims, 8 Drawing Sheets

(56) References Cited

U.S. PATENT DOCUMENTS

| | | | | |
|---|---|---|---|---|
| 2004/0071872 | A1 | 4/2004 | Kawase | |
| 2011/0079158 | A1* | 4/2011 | Recchia | G03F 7/2012 428/161 |
| 2013/0112777 | A1* | 5/2013 | Gale | B05B 1/28 239/290 |
| 2013/0199916 | A1* | 8/2013 | Iwamoto | H03K 17/962 977/734 |
| 2016/0052312 | A1 | 2/2016 | Pitz et al. | |
| 2018/0200062 | A1 | 7/2018 | Meyenhofer et al. | |

FOREIGN PATENT DOCUMENTS

| | | | |
|---|---|---|---|
| EP | 3725419 | A1 | 10/2020 |
| JP | S61202839 | A | 9/1986 |
| JP | 2007117963 | A | 5/2007 |
| JP | 2013202781 | A | 10/2013 |
| JP | 201747569 | A | 3/2017 |
| JP | 2018202344 | A | 12/2018 |
| WO | 2009004120 | A1 | 1/2009 |
| WO | 2014165590 | A1 | 10/2014 |
| WO | 2015036235 | A1 | 3/2015 |
| WO | 2018108570 | A1 | 6/2018 |

* cited by examiner

COATING DEVICE, COATING FILM, AND COATING METHOD

CROSS-REFERENCE TO RELATED APPLICATION(S)

This application is a national stage application of International Application No. PCT/JP2020/032768, filed on Aug. 28, 2020, which claims priority to Japanese Patent Application No. 2019-159144, filed on Aug. 30, 2019.

TECHNICAL FIELD

Disclosed embodiments relate to a coating device, a coating film, and a coating method.

BACKGROUND ART

A coating device using an inkjet method is known. A head for discharging a coating material is mounted on such a coating device of an inkjet method.

CITATION LIST

Patent Literature

Patent Document 1: JP 2013-202781 A
Patent Document 2: JP 2018-202344 A

SUMMARY OF INVENTION

A coating device according to an aspect of the embodiment coats a to-be-coated object including a recessed portion extending in a first direction. The coating device includes a head, an arm, and a controller. The head includes a nozzle surface. The arm holds the head. The controller controls movement of the head via the arm. The controller moves the head in the first direction while causing the nozzle surface and the recessed portion to face each other in a posture in which a length of a first component of the head along the first direction is larger than a length of a second component of the head intersecting the first component.

DESCRIPTION OF EMBODIMENTS

Embodiments of a coating device, a coating film, and a coating method disclosed in the present application will be described in detail below with reference to the accompanying drawings. Note that the present invention is not limited to the embodiments that will be described below.

Configuration of Coating Device

Figure 1:
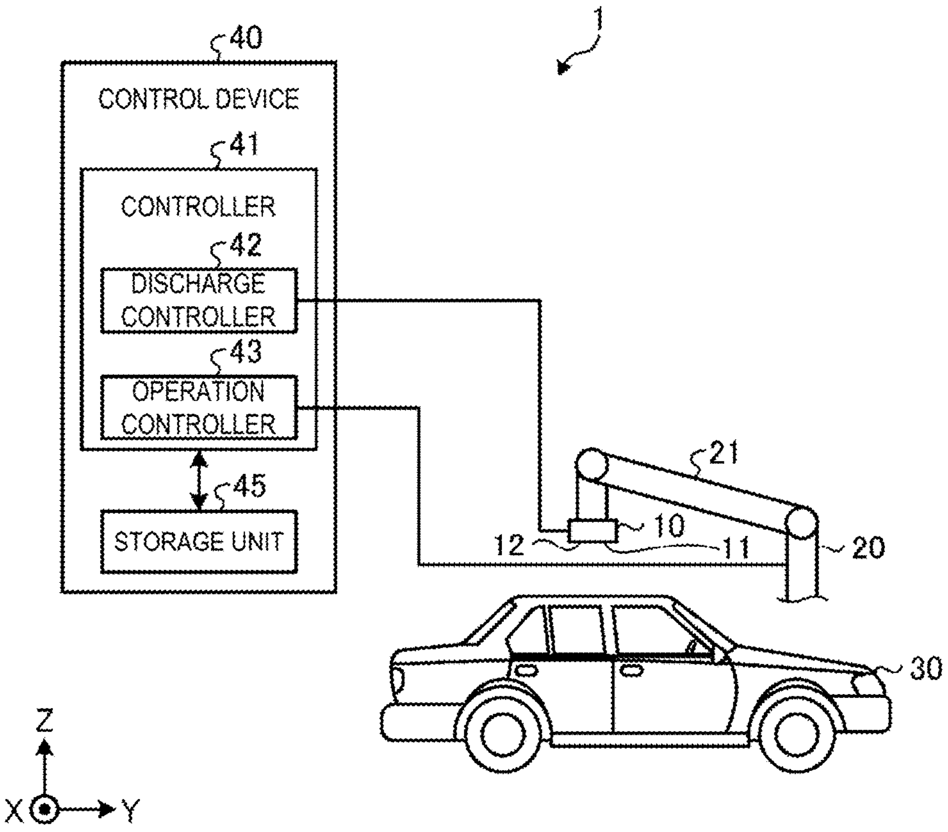
FIG. 1 is an explanatory view of a coating device according to an embodiment.

First, with reference to FIG. 1, a description will be given of an overview of a coating device according to an embodiment. FIG. 1 is an explanatory view of the coating device according to the embodiment. For the sake of clarity, FIG. 1 illustrates a three-dimensional orthogonal coordinate system including a Z-axis including a vertically upward direction serving as a positive direction and a vertically downward direction serving as a negative direction. Such an orthogonal coordinate system may also be illustrated in other drawings used in the description below. The same components as those of the coating device 1 illustrated in FIG. 1 are denoted by the same reference numerals, and descriptions thereof will be omitted or simplified.

As illustrated in FIG. 1, a coating device 1 includes a head 10, a robot 20, and a control device 40. The head 10 can use, for example, an inkjet head of a valve type, a piezo type, or a thermal type. When a piezo type or thermal type inkjet head is used as the head 10, high resolution is easily realized.

The head 10 is fixed to the robot 20. The head 10 moves in response to movement of the robot 20 controlled by the control device 40.

The head 10 coats a to-be-coated object 30 by depositing a coating material discharged from a plurality of discharge holes 11 located on a nozzle surface 12 onto a surface of the to-be-coated object 30 facing the nozzle surface 12.

The coating material is supplied to the head 10 from a tank (not illustrated). The head 10 discharges the coating material supplied from the tank. The coating material is a mixture containing a volatile component and a nonvolatile component, and has fluidity. Note that the tank may be a reservoir (not illustrated) housed in the head 10.

The volatile component is, for example, water, organic solvent, or alcohol, and adjusts the physical properties such as viscosity and surface tension of the coating material. The nonvolatile component contains, for example, a pigment, a resin material, and an additive. The pigment includes one or more colored pigments used depending on a desired coating color. The resin material is deposited on the to-be-coated object 30 and forms a film. The additive is a functional material that is added, for example for purposes of weather resistance and the like.

Note that the coating material supplied to the discharge holes 11 is prepared such that a desired coating color is expressed by mixing a plurality of colored pigments or coating materials at predetermined proportions.

The robot 20 holds the head 10. The robot 20 is, for example, a six-axis articulated robot. The robot 20 may be, for example, a vertical articulated robot or a horizontal articulated robot. The robot 20 includes a plurality of arms 21 with the head 10 fixed to a tip of the plurality of arms 21. The robot 20 is fixed to a floor, a wall, a ceiling, or the like. Note that as long as the held head 10 can be moved properly, there is no limit to the degree of freedom of the arms 21 included in the robot 20.

The control device 40 controls the coating device 1. The control device 40 includes a controller 41 configured to control the coating device 1, and a storage unit 45. The controller 41 includes a discharge controller 42 and an operation controller 43.

The controller 41 includes a computer or various circuits including, for example, a central processing unit (CPU), a read only memory (ROM), a random access memory (RAM), a hard desk drive (HDD), and an input/output port. The CPU of such a computer functions as the controller 41 by, for example, reading and executing the program stored in the ROM. The controller 41 may also be configured by hardware such as an application specific integrated circuit (ASIC) or a field programmable gate array (FPGA).

The discharge controller 42 controls the head 10 based on configuration information stored in the storage unit 45, and discharges the coating material from the plurality of discharge holes 11 toward the to-be-coated object 30. The operation controller 43 controls operations of the plurality of arms 21 based on the configuration information stored in the storage unit 45, and controls movement of the head 10 via the arms 21. The distance between the head 10 and the to-be-coated object 30 is maintained at, for example, approximately from 0.5 to 14 mm. Note that the detailed movement of the head 10 including the discharge of the coating material will be described later.

The storage unit 45 corresponds to, for example, the ROM and the HDD. The ROM and the HDD can store configuration information for various controls in the control device 40. The storage unit 45 stores information related to discharge control of the coating material by the head 10. Further, the storage unit 45 stores information related to the operation control of the plurality of arms 21. Note that the storage unit 45 may store data input by the user's instruction operation using a terminal apparatus (not illustrated) as instruction data for operating the robot 20. Further, the controller 41 may also acquire the configuration information via another computer or portable storage medium connected by a wired or wireless network.

The to-be-coated object 30 is, for example, a vehicle body. The to-be-coated object 30 is placed on a conveying device (not illustrated), and is carried in and out. The coating device 1 according to an embodiment coats the to-be-coated object 30 in a state where the conveying device is stopped. Note that the coating device 1 may coat the to-be-coated object 30 while the to-be-coated object 30 is being repeatedly conveyed and stopped, or may coat the to-be-coated object 30 while the to-be-coated object 30 is being conveyed.

Figure 2:
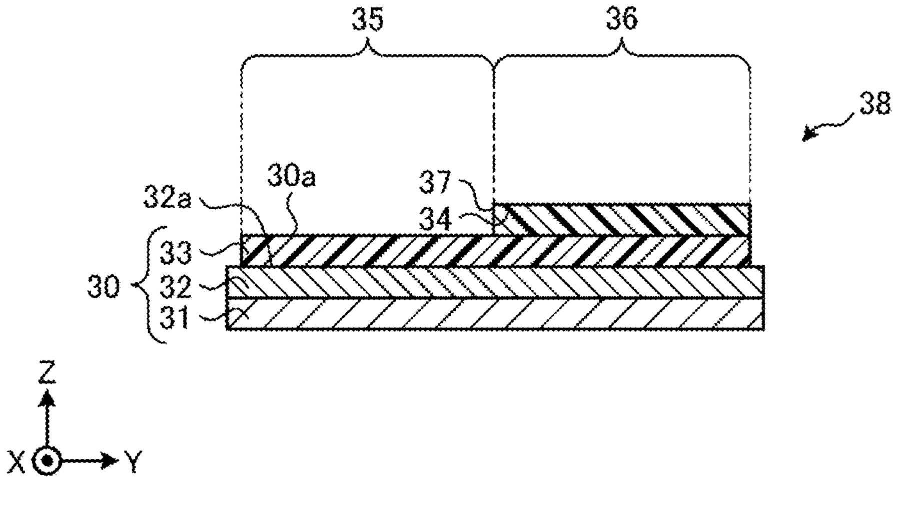
FIG. 2 is a cross-sectional view illustrating an example of a to-be-coated object that was coated.

FIG. 2 is a cross-sectional view illustrating an example of a to-be-coated object that was coated. The to-be-coated object 30 illustrated in FIG. 2 includes a base member 31, a primer layer 32, and a first coating layer 33. The base member 31 is, for example, a steel plate processed into a predetermined shape, and is subjected to an electrodeposition process as necessary to impart rust resistance thereto. The primer layer 32 is provided for imparting weather resistance, color development, and peeling resistance, for example. The first coating layer 33 is, for example, a base layer that has smoothness and weather resistance and imparts a desired coating color. A surface of the first coating layer 33 serves as a to-be-coated surface 30*a* to be coated by the coating device 1 according to the embodiment.

A second coating layer 34 is located on the first coating layer 33 serving as the to-be-coated surface 30*a*. The second coating layer 34 is located so as to cover a portion of the first coating layer 33 with a coating material having a coating color different from that of the first coating layer 33. As a result, the to-be-coated object 30 becomes a coated body 38 that is coated in a so-called two tone color in which a region 36 where the second coating layer 34 is located and a region 35 where the first coating layer 33 is exposed without the second coating layer 34 being located are aligned with an end portion 37 of the second coating layer 34 as a boundary.

In the example illustrated in FIG. 2, the coating device 1 has been described such that the second coating layer 34 is located on the to-be-coated surface 30*a* on the first coating layer 33, but the present invention is not limited thereto, and the coating device 1 may be applied, for example, when the first coating layer 33 is located on a coated surface 32*a* on the primer layer 32.

Note that the coated body 38 is not limited to the example illustrated in FIG. 2. For example, a coating layer (not illustrated) may be located on the surfaces of the regions 35 and 36. Further, the second coating layer 34 need not be included, and only the first coating layer 33 may be included, and the second coating layer 34 may be located on the entire surface of the first coating layer 33. Further, the to-be-coated object 30 or the coated body 38 may further include one or a plurality of layers (not illustrated).

First Embodiment

Figure 3:
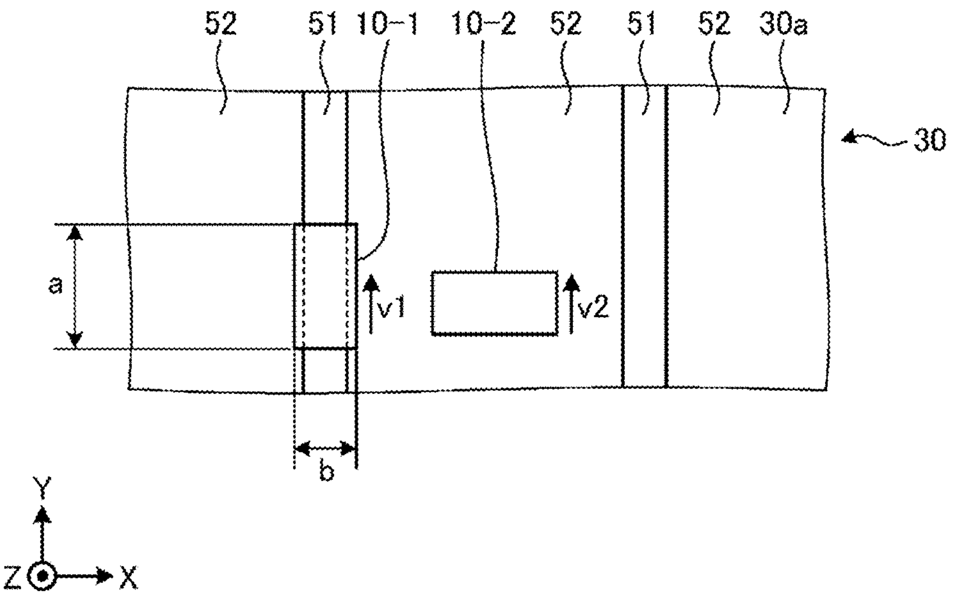
FIG. 3 is a plan view illustrating an example of a head included in a coating device according to a first embodiment.

FIG. 3 is an explanatory diagram illustrating an example of a head included in a coating device according to a first embodiment. FIG. 3 corresponds to a plan view of the head 10 and the to-be-coated object 30 facing the nozzle surface 12 (see FIG. 1) of the head 10 as viewed from a Z-axis positive direction side. Note that, for ease of explanation, the to-be-coated object 30 has a planar shape along an XY plane, such as a roof of a vehicle body, for example.

The to-be-coated object 30 includes a portion 51 where a recessed portion extending along a Y-axis direction serving as a first direction is located, and a portion 52 where the recessed portion is not located. The portion 51 is a groove for attaching a roof rail located on a roof of the vehicle body, for example.

Further, in each embodiment described below, an example will be given of a case in which the head 10 discharges a coating material that positions the second coating layer 34 on the to-be-coated surface 30*a*. Further, the coating device 1 according to each embodiment described below has a common configuration, except for the movement of the head 10. As a result, other configurations, such as the robot 20 and the control device 40, except for the head 10, are omitted from the drawings.

The head 10-1 illustrated in FIG. 3 is located such that a length direction is along the Y-axis direction, and moves in the Y-axis direction in a state where the portion 51 and the nozzle surface 12 (see FIG. 1) face each other. The head 10-1 can increase a discharge amount of the coating material with respect to the to-be-coated surface 30*a* in a narrow range by moving in the length direction. Thus, when such a head 10-1 is used, even the portion 51 (recessed portion), which is more distant from the to-be-coated surface 30*a* than the portion 52, can be coated with good appearance.

In contrast, the head 10-2 is located such that a length direction is along an X-axis direction serving as a second direction intersecting the first direction, and moves in the Y-axis direction in a state where the portion 52 and the nozzle surface 12 (see FIG. 1) face each other. As a result, the head 10-2 can coat the to-be-coated surface 30*a* in a wide range with respect to the size of the head 10-2 with good appearance by one movement in a width direction intersecting the length direction. Thus, it is suitable for coating the portion 52.

Here, a surface area coating speed of, for example, 1 $m^2$/min or more and 5 $m^2$/min or less may be achieved using the heads 10-1 and 10-2. In order to achieve such a surface area coating speed, assuming the length of the print region of the head 10-2 that coats the portion 52 is 100 mm, a movement speed v2 of the head 10-2 in the Y-axis direction may be a predetermined speed of, for example, $1.67\times10^2$ mm/s or more and $41.67\times10^2$ mm/s or less.

Further, a movement speed v1 of the head 10-1 that coats the portion 51 in the Y-axis direction can be expressed as $v1\leq v2\times(a/b)$, where a is a size of the head 10-1 in the length direction, and b is a size in the width direction intersecting the length direction. As described above, according to the coating device according to the present embodiment, by defining the movement speeds v1 and v2, it is possible to coat the entirety of the to-be-coated surface 30*a* with good appearance.

By changing the posture of the head 10 in accordance with the presence or absence of the recessed portion in this manner, the appearance is improved across the entirety of the to-be-coated surface 30*a*. Thus, the coating quality can be improved. Note that the heads 10-1 and 10-2 illustrated in FIG. 3 mean that, for example, one head 10 included in the coating device 1 illustrated in FIG. 1 is controlled to be positioned so as to have a posture corresponding to a to-be-coated portion. However, the coating device 1 may include each of the heads 10-1 and 10-2 individually.

The resolution of the head 10 included in the coating device 1 can be, for example, 150 dots per inch (dpi) or more. More preferably, the resolution of the head 10 is 300 dpi or more. When the resolution of the head 10 is 150 dpi or more, the leveling property is improved and the quality of the coating film is improved. Note that the resolution of the head 10 need not necessarily be 150 dpi or more.

Second Embodiment

Figure 4:
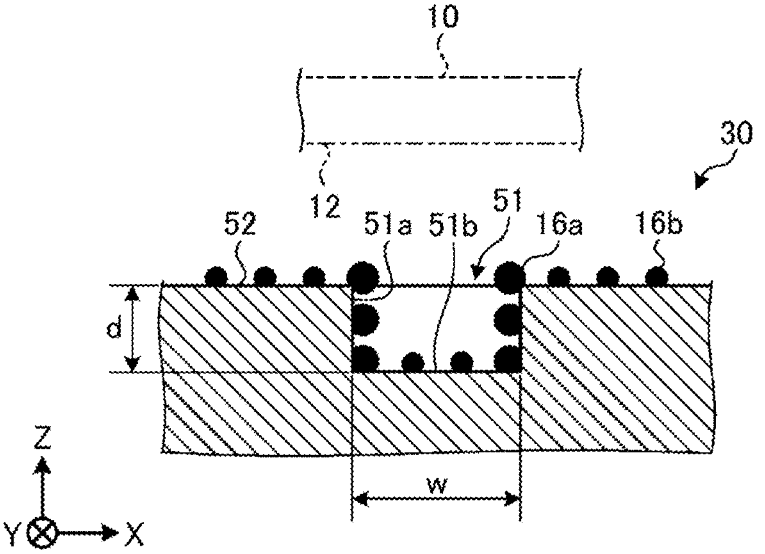
FIG. 4 is a cross-sectional view illustrating an example of coating of a recessed portion by a coating device according to a second embodiment.

FIG. 4 is a cross-sectional view illustrating an example of coating of a recessed portion by a coating device according to a second embodiment. As illustrated in FIG. 4, the discharge amount of the coating material is different in first surfaces 51*a* serving as side surfaces of the portion 51 compared with a second surface 51*b* serving as a bottom surface of the portion 51 and the portion 52. Specifically, the coating device according to the present embodiment differs in terms of the size of discharge drops of the coating material discharged from the head 10 so that the discharge amount of the coating material corresponding to the first surfaces 51*a* is larger than the discharge amount of the coating material corresponding to a portion other than the first surfaces 51*a*. As one example, discharge drops 16*a* discharged onto the first surfaces 51*a* are made larger than discharge drops 16*b* discharged onto the other portion.

In general, the first surfaces 51*a* located in a direction intersecting the nozzle surface 12 (see FIG. 1) of the head 10 are greatly affected by a slight displacement of the discharge drops as compared with the portion other than the first surfaces 51*a*, and the coating is difficult. Thus, in the coating device according to the present embodiment, by increasing the discharge amount of the coating material corresponding to the first surfaces 51*a* as compared with the other portion, even when discharge drops are displaced, other discharge drops can cover the displaced portion, and the coating accuracy is improved. Thus, according to the coating device according to the present embodiment, the coating quality can be improved.

Figure 5A:
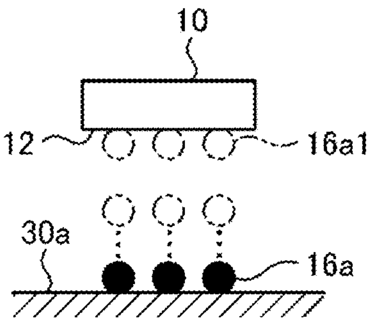
FIG. 5A is an explanatory diagram comparing a discharging technique of a coating material.
Figure 5B:
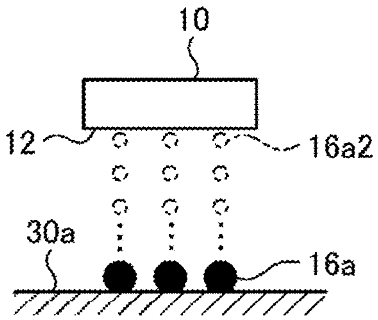
FIG. 5B is an explanatory diagram comparing a discharging technique of a coating material.

Here, a specific example of a technique for increasing the size of discharge drops of the coating material will be described with reference to FIGS. 5A and 5B. FIGS. 5A and 5B are explanatory diagrams comparing discharging techniques for discharging the coating material. Note that, in order to simplify explanation by illustration, FIGS. 5A and 5B illustrate the to-be-coated surface 30*a* located to face the nozzle surface 12 instead of the first surfaces 51*a* located in a direction intersecting the nozzle surface 12 of the head 10.

In the example illustrated in FIG. 5A, the discharge drops 16*a* having a size corresponding to a coating material 16*a*1 discharged from the nozzle surface 12 of the head 10 are located on the to-be-coated surface 30*a*. In other words, the discharge amount of the coating material 16*a*1 corresponds to the size of the discharge drops 16*a*. The head 10 illustrated in FIG. 5A is, for example, preferably prepared separately from the head 10 that discharges the discharge drops 16*b*. Thus, the coating device 1 according to the embodiment can include a plurality of heads 10 having different discharge drop sizes.

On the other hand, the example illustrated in FIG. 5B differs from the example illustrated in FIG. 5A in that the size of a coating material 16*a*2 discharged from the nozzle surface 12 of the head 10 is smaller than that of the discharge drops 16*a*. By controlling a discharge gap of the coating material 16*a*2 and combining a plurality of the coating materials 16*a*2 until reaching the to-be-coated surface 30*a*, the discharge drops 16*a* larger than the coating material 16*a*2 can be located on the to-be-coated surface 30*a*. Thus, in the coating device 1 according to the embodiment, the discharge controller 42 controls the discharge gap from the nozzle surface 12, so that an end portion region 36*c* and a center region 36*d* can be coated with one type of head 10.

Returning to FIG. 4, the width of the recessed portion, that is, a length w along the X-axis direction of the portion 51, can be equal to or larger than the depth of the recessed portion, that is, a length d along the Z-axis direction of the first surfaces 51*a*. The recessed portion having such a shape is easily coated with good appearance. However, by appropriately controlling the size of the discharge drops 16*a*, the coating quality can be improved even in the portion 51 where d>w.

Third Embodiment

Figure 6:
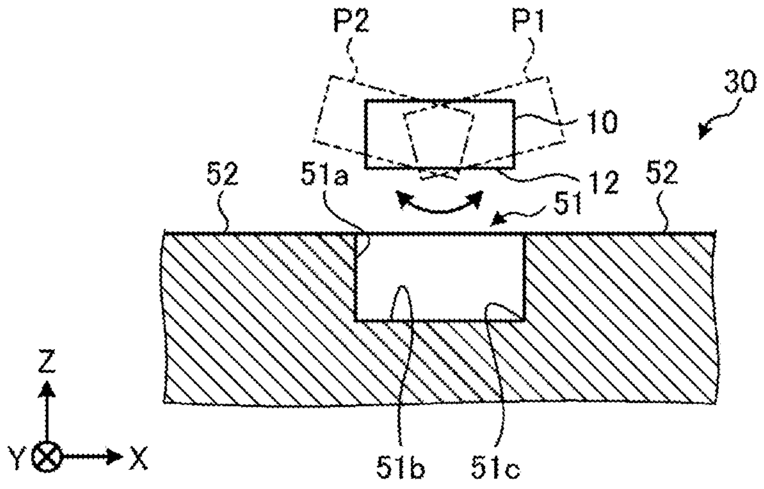
FIG. 6 is an explanatory diagram illustrating an example of coating of a recessed portion by a coating device according to a third embodiment.

FIG. 6 is an explanatory diagram illustrating an example of coating of the recessed portion by a coating device according to a third embodiment. The head 10 included in the coating device 1 according to the present embodiment oscillates from a position P1 to a position P2 so that the nozzle surface 12 faces inner surfaces of the recessed portion, that is, the first surfaces 51*a* and the second surface 51*b*. By oscillating the head 10 in this manner, the coating material is easily appropriately spread not only on the first surfaces 51*a* and the second surface 51*b*, but also on corner portions 51*c* where the first surfaces 51*a* and the second surface 51*b* intersect each other. Thus, the coating quality can be improved.

Fourth Embodiment

Figure 7A:
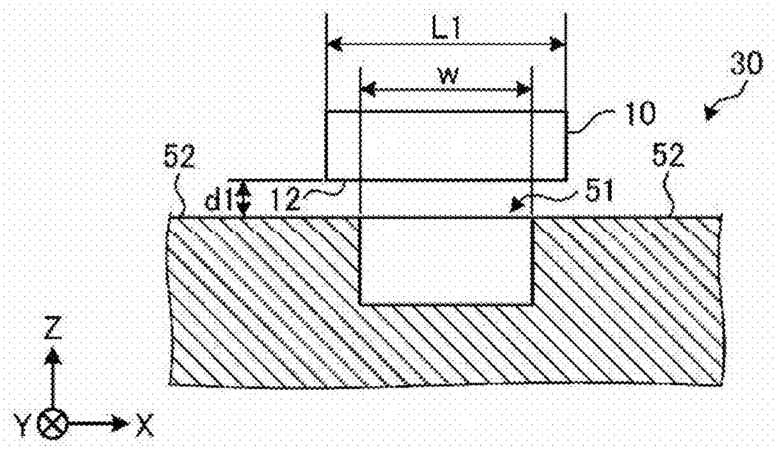
FIG. 7A is an explanatory diagram illustrating a relationship between a head included in a coating device according to a fourth embodiment and a recessed portion.
Figure 7B:
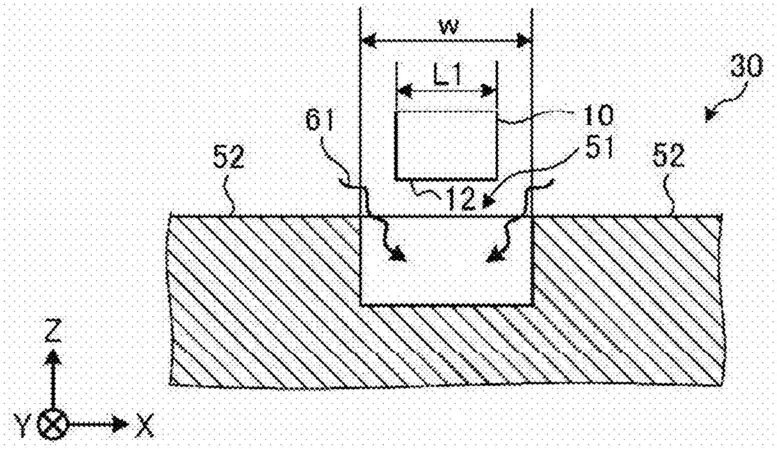
FIG. 7B is an explanatory diagram illustrating a relationship between a head included in a coating device and a recessed portion.

FIGS. 7A and 7B are explanatory diagrams illustrating relationships between a head included in a coating device and a recessed portion. In the head 10 illustrated in FIG. 7B, a length L1 of the nozzle surface 12 along the X-axis direction is smaller than a length w of the portion 51. Thus, air flow 61 from a periphery of the head 10 is more likely to enter into the portion 51. As a result, the coating material discharged from the nozzle surface 12 deviates from a desired position and reaches the inside of the portion 51, and the coating quality is likely to deteriorate.

In contrast, as illustrated in FIG. 7A, in the head 10 included in the coating device according to the fourth embodiment, the length L1 of the nozzle surface 12 of the head 10 along the X-axis direction is larger than the length w of the portion 51. Thus, the nozzle surface 12 prevents the air flow 61 from entering from the periphery of the head 10, so that the air flow 61 is less likely to enter the inside of the portion 51. As a result, according to the coating device according to the present embodiment, the coating quality of the inside of the portion 51 is improved.

Here, a gap between the head 10 included in the coating device according to the present embodiment and the recessed portion, that is, a gap dl between the nozzle surface 12 and the portion 52 (see FIG. 7) can be, for example, from approximately 0.5 to approximately 14 mm. By defining the gap dl in this manner, it is easy to prevent the air flow 61 from entering.

Fifth Embodiment

Figure 8:
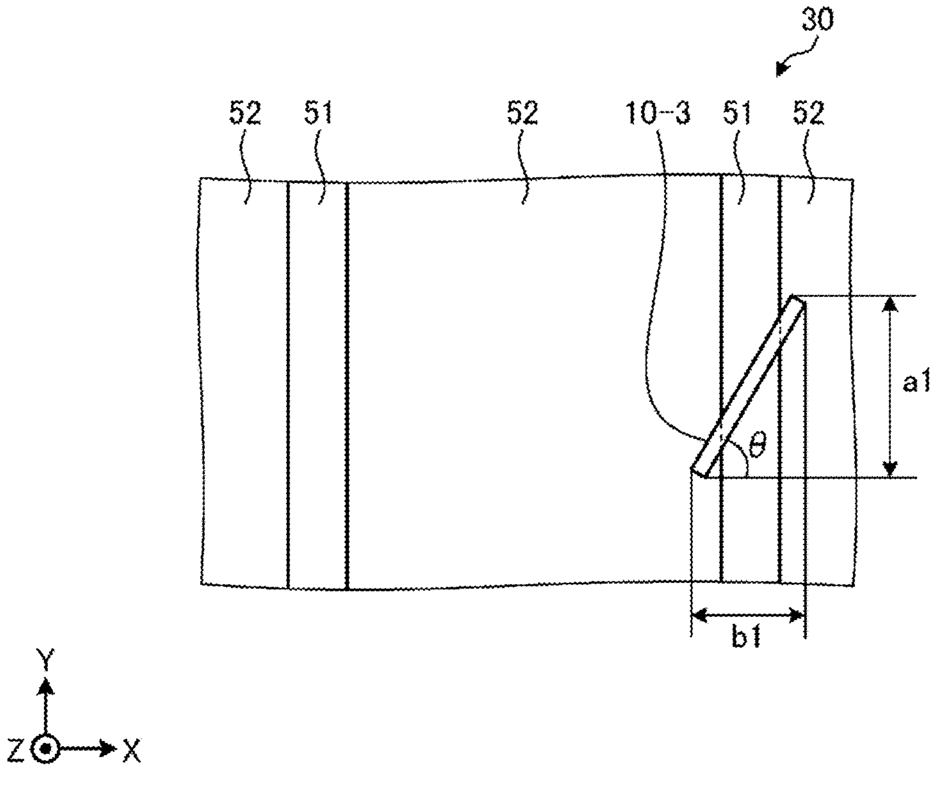
FIG. 8 is a plan view illustrating an example of a head included in a coating device according to a fifth embodiment.

FIG. 8 is a plan view illustrating an example of a head included in a coating device according to a fifth embodiment. In the head 10-3 illustrated in FIG. 8, a dimension in the width direction intersecting the length direction is smaller than a length along the X-axis direction of the portion 51. In such a head 10-3, the length direction of the head 10-3 is preferably inclined with respect to the Y-axis direction so that the entirety of the portion 51 can be coated with one movement in the Y-axis direction. In this case, in the head 10-3, when an angle θ is defined such that, a length in the Y-axis direction, that is, a length al of a first component projected in the X-axis direction is larger than a length in the X-axis direction, that is, a length b1 of a second component projected in the Y-axis direction, the coating quality of the inside of the portion 51 is improved.

Figure 9:
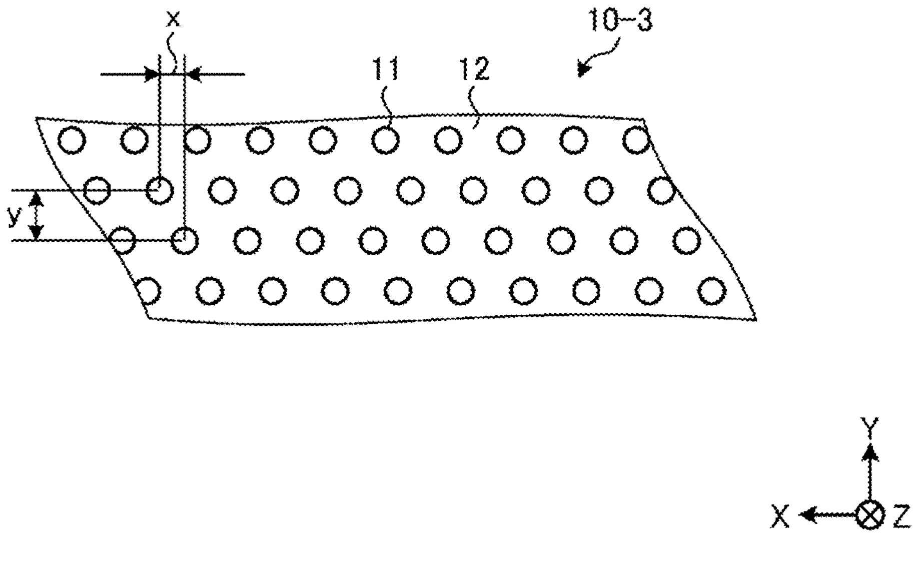
FIG. 9 is a plan view illustrating an example of a nozzle surface of the head.

Further, the angle θ may be set based on the arrangement of the discharge holes 11 located on the nozzle surface 12. FIG. 9 is a plan view illustrating an example of the nozzle surface of the head.

As illustrated in FIG. 9, the nozzle surface 12 includes a plurality of rows in the width direction of the head 10-3 (here, in the Y-axis direction), each row including the plurality of discharge holes 11 arranged along the length direction of the head 10-3 (here, the X-axis direction) as one unit. In this case, an inclination of the head 10-3 in the length direction with respect to the X-axis direction, that is, an angle θ has a relationship of, for example, $\tan\theta \geq (x/y)$, where x is a distance in the length direction, and y is a distance in the width direction, between corresponding ones of the discharge holes 11 when a gap between adjacent ones of rows is maximum. By defining the angle θ in this way, even in a case where, for example, the gap between adjacent ones of rows is large, the discharge drops discharged from the adjacent discharge holes 11 fill the gap, so that coating streaks are less likely to occur, and the coating quality is improved.

Sixth Embodiment

Figure 10:
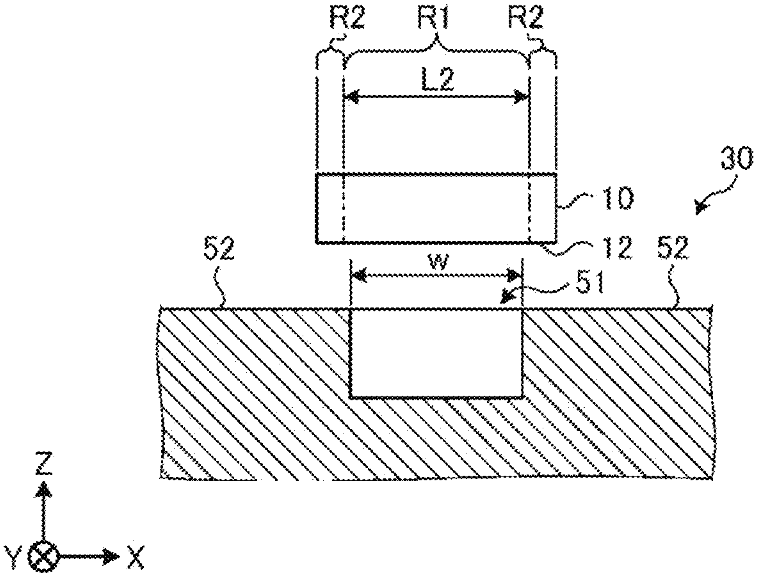
FIG. 10 is an explanatory diagram illustrating a relationship between a head included in a coating device according to a sixth embodiment and a recessed portion.

FIG. 10 is an explanatory diagram illustrating a relationship between a head included in a coating device according to a sixth embodiment and a recessed portion. As illustrated in FIG. 10, the nozzle surface 12 of the head 10 included in the coating device 1 according to the present embodiment includes a first region R1 including a plurality of discharge holes 11 discharging the coating material, and second regions R2 surrounding the first region R1. In this case, by making a length L2 in the X-axis direction of the first region R1 larger than the length w of the portion 51 in the X-axis direction, the entirety of the portion 51 can be coated with one movement in the Y-axis direction. Thus, productivity is improved. In particular, when $L2-W \geq 3$ mm, the occurrence of coating unevenness of the portion 51 is further reduced.

Coating Film

Figure 11A:
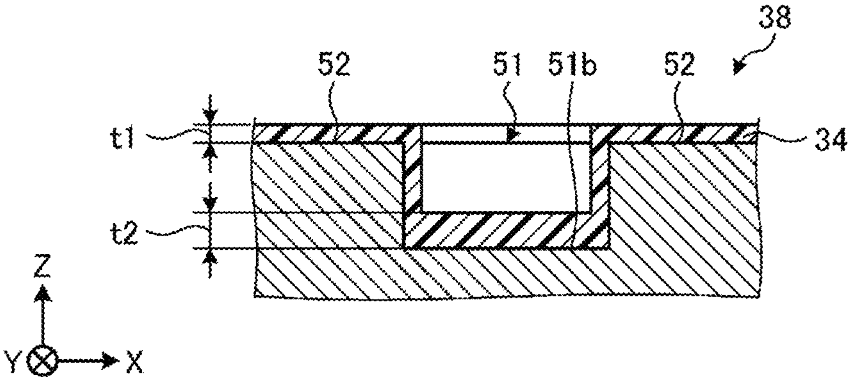
FIG. 11A is a cross-sectional view illustrating an example of a coated body according to an embodiment.
Figure 11B:
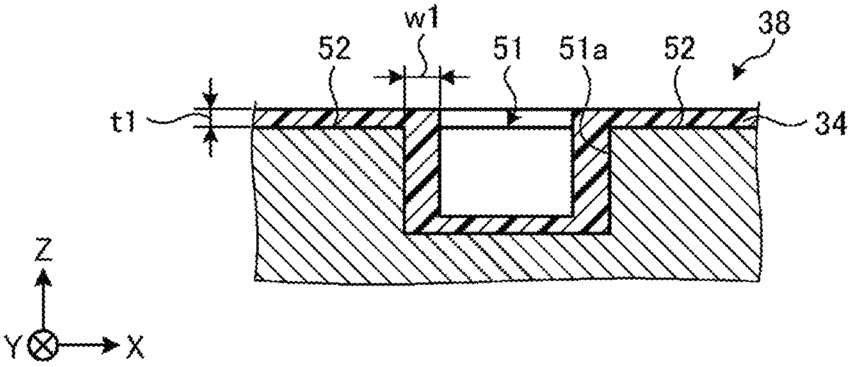
FIG. 11B is a cross-sectional view illustrating an example of a coated body according to an embodiment.
Figure 11C:
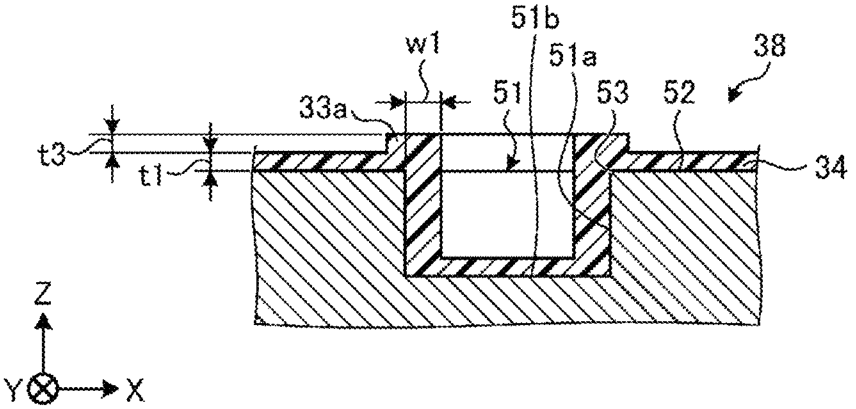
FIG. 11C is a cross-sectional view illustrating an example of a coated body according to an embodiment.

Next, a coating film coated by the coating device 1 according to each of the above embodiments will be described. FIGS. 11A to 11C are cross-sectional views illustrating examples of coated bodies according to the embodiments.

In the coated body 38 illustrated in FIG. 11A, a thickness t2 of the second coating layer 34 serving as a coating film located on the second surface 51*b* serving as the bottom surface of the recessed portion is larger than a thickness t1 of the second coating layer 34 located on the portion 52 where the recessed portion is not located. By increasing the thickness t2 in this manner, even when a member such as the roof rail is attached to the portion 51, the second coating layer 34 is less likely to peel off. Thus, according to the coating film according to the embodiment, the coating quality is improved, and the environmental strength of the coated body 38 is improved.

Further, in the coated body 38 illustrated in FIG. 11B, a width w1 of the second coating layer 34 in the X-axis direction located on the first surfaces 51*a* serving as side surfaces of the recessed portion is larger than the thickness t1 of the second coating layer 34 located on the portion 52 where the recessed portion is not located. By increasing the width w1 in this manner, even when a member such as a roof rail is attached to the portion 51, for example, the second coating layer 34 is less likely to peel off. Thus, according to the coating film according to the embodiment, the coating quality is improved, and the environmental strength of the coated body 38 is improved.

Further, the coated body 38 illustrated in FIG. 11C includes a protruding portion 33*a* protruding in the Z-axis direction on corner portions 53 located at an end portion on the head side of the first surfaces 51*a* serving as the side surfaces of the recess portion. As a result, a thickness (t1+t3) of the second coating layer 34 in the Z-axis direction located on the corner portions 53 is larger than the thickness t1 of the second coating layer 34 located on the portion 52 where the recessed portion is not located. By increasing the thickness of the second coating layer 34 located on the corner portions 53 in this manner, even when a member such as a roof rail is attached to the portion 51, for example, the second coating layer 34 is less likely to peel off. Thus, according to the coating film according to the embodiment, the coating quality is improved, and the environmental strength of the coated body 38 is improved.

Variation

Figure 12:
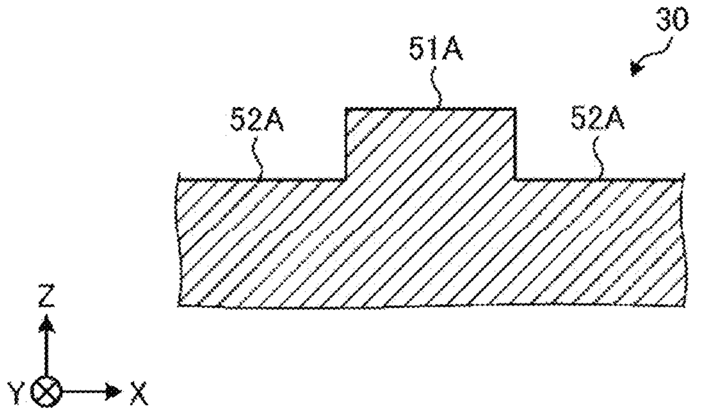
FIG. 12 is a cross-sectional view illustrating another example of a to-be-coated object.
Figure 13A:
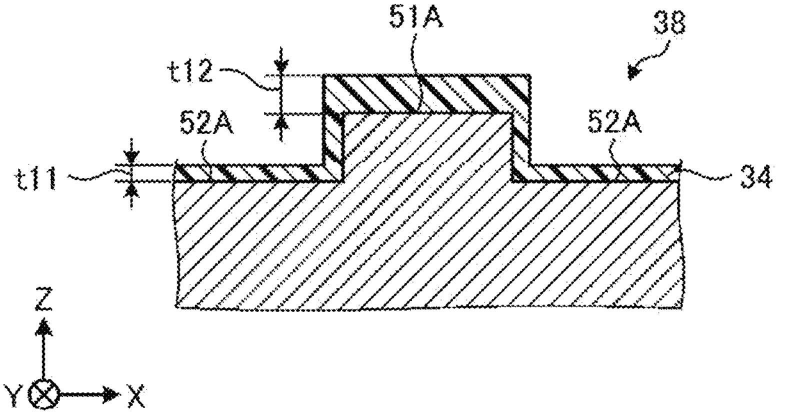
FIG. 13A is a cross-sectional view illustrating an example of a coated body according to a variation of an embodiment.
Figure 13B:
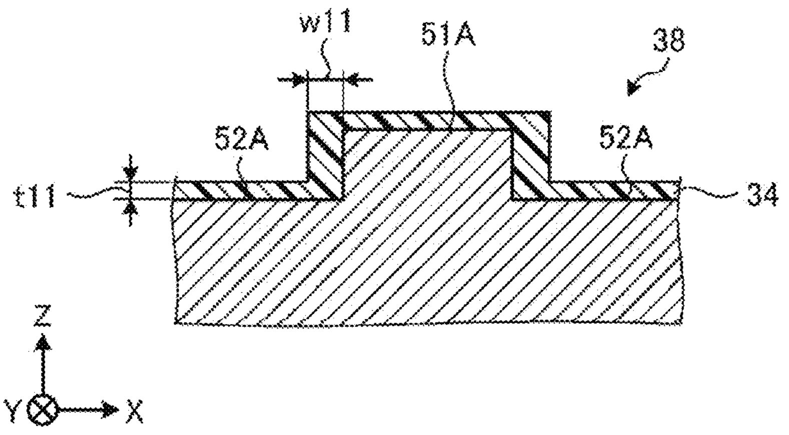
FIG. 13B is a cross-sectional view illustrating an example of a coated body according to a variation of an embodiment.

In each of the embodiments described above, the to-be-coated object 30 includes the recessed portion extending in the first direction, but the present invention is not limited thereto, and may include, for example, a protruding portion extending in the first direction. FIG. 12 is a cross-sectional view illustrating another example of the to-be-coated object. FIGS. 13A and 13B are cross-sectional views illustrating examples of coated bodies according to variations of the embodiments.

The to-be-coated object 30 illustrated in FIG. 12 includes a portion MA where a protruding portion extending along the Y-axis direction serving as the first direction is located, and a portion 52A where the protruding portion is not located. The portion MA is, for example, a vortex generator, or a corrugated roof.

Further, in the coated body 38 illustrated in FIG. 13A, a thickness t12 of the second coating layer 34 located on the portion MA serving as the protruding portion is larger than a thickness t11 of the second coating layer 34 located on the portion 52A where the protruding portion is not located. By increasing the thickness t12 in this manner, even when a member is attached to the portion MA, for example, the second coating layer 34 is less likely to peel off. Thus, according to the coating film according to the embodiment, the coating quality is improved, and the environmental strength of the coated body 38 is improved.

Further, in the coated body 38 illustrated in FIG. 13B, a width w11 in the X-axis direction of the second coating layer 34 located on the portion 51A serving as the protruding portion is larger than the thickness t11 of the second coating layer 34 located on the portion 52A where the protruding portion is not located. By increasing the width w11 in this manner, even when the member is attached to the portion 51A, for example, the second coating layer 34 is less likely to peel off. Thus, according to the coating film according to the embodiment, the coating quality is improved, and the environmental strength of the coated body 38 is improved.

Each embodiment according to the present invention was described above. However, the present invention is not limited to the embodiments described above, and various modifications can be made without departing from the essential spirit of the present invention. For example, in the embodiments described above, the coating device 1 including one head 10 for discharging a single color coating material was described. However, for example, robots 20 respectively holding heads 10 for discharging coating materials of basic colors such as magenta (M), yellow (Y), cyan (C), and black (K) may be included.

Further, in the embodiments described above, the example is illustrated in which the coating is performed on the to-be-coated surface 30*a* from the Z-axis positive direction side, but the present invention is not limited thereto. for example, the coating is performed from the Z-axis negative direction side, and side surfaces located along the YZ plane or the ZX plane may be the to-be-coated surface 30*a*. Further, the coating device 1 may be applied to a case where the to-be-coated surface 30*a* located obliquely with respect to the Z-axis is coated.

Further, two or more of the embodiments may be combined as appropriate.

As described above, the coating device 1 according to the embodiments coats the to-be-coated object 30 including the recessed portion extending in the first direction. The coating device 1 includes the head 10, the arm 21, and the controller 41. The head 10 includes the nozzle surface 12. The arm 21 holds the head 10. The controller 41 controls the movement of the head 10 via the arm 21. The controller 41 moves the head 10 in the first direction while causing the nozzle surface 12 and the recessed portion to face each other in a posture in which the length of the first component along the first direction of the head 10 is larger than the length of the second component of the head 10 intersecting the first component. Thus, the coating quality can be improved.

Additional effects and variations can be easily derived by a person skilled in the art. Thus, a wide variety of aspects of the present invention are not limited to the specific details and representative embodiments represented and described above. Accordingly, various changes are possible without departing from the spirit or scope of the general inventive concepts defined by the appended claims and their equivalents.

The invention claimed is:

1. A coating device configured to coat a to-be-coated object comprising a recessed portion extending in a first direction, the coating device comprising:
- a head comprising a nozzle surface;
- an arm configured to hold the head; and
- a controller configured to control movement of the head via the arm, wherein
- the controller is configured to control movement of the head in the first direction while causing the nozzle surface to face the recessed portion in a posture of the head in which a length of a first component of the head along the first direction is greater than a length of a second component of the head along a second direction that intersects the first direction.

2. The coating device according to claim 1, wherein
- the controller is configured to control movement of the head in the first direction while causing the nozzle surface to face the to-be-coated object other than the recessed portion in a posture of the head in which a width direction intersecting a length direction of the head in a plan view is along the first direction.

3. The coating device according to claim 1 wherein,
- the controller is configured to control movement of the head in the first direction while causing the nozzle surface to face the recessed portion in a posture of the head in which a length direction of the head in a plan view is along the first direction.

4. The coating device according to claim 1, wherein
- the controller is configured to change discharge of a coating material from the nozzle surface to cause a discharge amount of the coating material corresponding to side surfaces of the recessed portion to be greater than a discharge amount of the coating material corresponding to a portion of the to-be-coated object other than the side surfaces of the recessed portion.

5. The coating device according to claim 1, wherein
- the head is configured to vibrate, and the nozzle surface faces inner surfaces of the recessed portion.

6. The coating device according to claim 1, wherein
- the nozzle surface comprises a first region comprising a plurality of discharge holes configured to discharge a coating material, and a second region surrounding the first region, and a length of the first region in the second direction intersecting the first direction is greater than a length of the recessed portion.

7. The coating device according to claim 1, wherein a length of the nozzle surface in the second direction intersecting the first direction is greater than a length of the recessed portion in the second direction.

8. The coating device according to claim 1, wherein the nozzle surface comprises a plurality of rows in a width direction of the head, each row of the plurality of rows comprising a plurality of discharge holes arranged as one unit in a length direction of the head, and an angle θ of a length direction of the head with respect to the second direction intersecting the first direction has a relationship of $\tan \theta \geq (x/y)$, where x is a distance in the length direction and y is a distance in the width direction, between corresponding discharge holes of plurality of the discharge holes when a gap between adjacent rows of the plurality of rows is maximum.

9. A coating method configured to coat a to-be-coated object comprising a recessed portion extending in a first direction, the method comprising:

causing a nozzle surface of a head to face the recessed portion in a posture of the head in which a length of a first component of the head along the first direction is greater than a length of a second component of the head along a second direction that intersects the first direction; and moving the head in the first direction.

10. A coating device configured to coat a to-be-coated object comprising a protruding portion extending in a first direction, the coating device comprising:

a head comprising a nozzle surface;

an arm configured to hold the head; and a controller configured to control movement of the head via the arm, wherein the controller is configured to control movement of the head in the first direction while causing the nozzle surface to face the protruding portion in a posture of the head in which a length of a first component of the head along the first direction of the head is greater than a length of a second component of the head along a second direction that intersects the first direction.

* * * * *